United States Patent
Zhou et al.

(10) Patent No.: US 10,387,813 B2
(45) Date of Patent: Aug. 20, 2019

(54) DATA ANALYSIS FOR OPTIMIZATIONS OF SCHEDULING WITH MULTIPLE LOCATION VARIABLES

(71) Applicant: SAP SE, Walldorf (DE)

(72) Inventors: Wenjun Zhou, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 707 days.

(21) Appl. No.: 14/981,040

(22) Filed: Dec. 28, 2015

(65) Prior Publication Data

US 2017/0185947 A1    Jun. 29, 2017

(51) Int. Cl.
*G06Q 10/00* (2012.01)
*G06Q 10/06* (2012.01)
*G06Q 10/08* (2012.01)

(52) U.S. Cl.
CPC .......... *G06Q 10/063118* (2013.01); *G06Q 10/08355* (2013.01)

(58) Field of Classification Search
CPC ......................................... G06Q 10/00–50/00
USPC .................................. 705/7.11–7.42
See application file for complete search history.

(56) References Cited

U.S. PATENT DOCUMENTS

| | | | |
|---|---|---|---|
| 2004/0187121 A1* | 9/2004 | Barth ................... | G06Q 10/08 718/100 |
| 2008/0077464 A1* | 3/2008 | Gottlieb ................ | G06Q 10/08 705/28 |

OTHER PUBLICATIONS

Jin Ai, "A particle swarm optimization for the vehicle routing problem with simultaneous pickup and delivery", Apr. 11, 2008, pp. 1693-1702 (Year: 2008).*
Asanga Ratnaweera, "Self-Organizing Hierarchical Particle Swarm Optimizer With Time-Varying Acceleration Coefficients" Jun. 2004, vol. 8 (Year: 2004).*
Yannis Marinakis, "Particle Swarm Optimization for the Vehicle Routing Problem with Stochastic Demands," Jan. 22, 2013, pp. 1693-1704 (Year: 2013).*
Wenjing Zhang, "An Improved Particle Swarm Optimization for the Multi-Depot Vehicle Routing Problem", 2010, pp. 3188-3191 ( Year: 2010).*

* cited by examiner

*Primary Examiner* — Alan S Miller
*Assistant Examiner* — Mustafa Iqbal
(74) *Attorney, Agent, or Firm* — Klarquist Sparkman, LLP

(57) ABSTRACT

A multi-depot delivery schedule optimizer includes an iteration controller to initialize scheduling iterations for determining an optimized route schedule for a plurality of demands and a plurality of vehicles, in which at least one of the route schedules includes a first depot as a start location, at least one delivery location, and a second depot as an end location. The multi-depot delivery schedule optimizer further includes a particle handler to define a plurality of particles within a solution space of allowable route schedules, each particle representing an allowable route schedule and represented by a corresponding position within the solution space.

19 Claims, 6 Drawing Sheets

DATA ANALYSIS FOR OPTIMIZATIONS OF SCHEDULING WITH MULTIPLE LOCATION VARIABLES

TECHNICAL FIELD

This description relates to data analysis for predictive scheduling.

BACKGROUND

High volumes of data are captured, stored, and available for use in various types of decision-making. However, it is often difficult or impossible for human users of such data to interpret and apply the data, and to engineer computers to operate based on the data and in a manner that optimizes use of the available data.

Computers are often used in various types of scheduling operations, and many such scheduling operations are straightforward. In some contexts, however, it is still difficult or impossible to make large-scale, accurate, and/or timely scheduling decisions, particularly when certain scheduling constraints exist, and/or when a large number of scheduling variables are present.

For example, some scheduling data relates to scheduling delivery operations with multiple location variables and associated constraints. In particular, scheduling shipments when multiple delivery depots are available will be subject to such location variables. For example, multiple depots may be available for access and use by one or more delivery trucks that are delivering goods from the multiple depots to one or more locations.

SUMMARY

The present description provides data analysis to predict and control schedules of vehicles that are transporting goods with multiple location variables, such as delivering goods when multiple delivery depots are available. The data analysis relies on available data characterizing the type, quantity, and location of each of the potentially available delivery depots, as well as data characterizing orders or other (past, present, or future) requests for goods to be delivered from the depots. The data analysis also analyzes data characterizing the transport vehicles to be scheduled (e.g., vehicle capacity, or loading/unloading times), a nature and extent of time constraints associated with the delivery from multiple depots, and other factors.

Through predictive data analysis, the above and other types of data may be used to obtain an initial solution, and then to optimize the solution using an iterative algorithm. The iterative updating algorithm may continue until some termination condition is reached.

The results may be used to determine whether to accept a shipment order, and/or may be used to control a schedule of a truck, ship, or other vehicle transporting goods using multiple depots. As a result, goods may be delivered in a manner that optimizes a speed, reliability, and/or profit of the transportation process.

According to one general aspect, a computer program product is tangibly embodied on a non-transitory computer-readable storage medium and includes instructions that, when executed, are configured to cause at least one computing device to access a demand database storing a plurality of demands for delivery, each demand specifying at least one item for delivery, and at least one delivery location, access a vehicle database to obtain vehicle data for a plurality of delivery vehicles, and access a depot database storing a plurality of depots, each depot representing a potential start location or end location for each delivery vehicle. The instructions, when executed, are further configured to cause at least one computing device to initialize scheduling iterations for determining an optimized route schedule for the plurality of demands and the plurality of vehicles, in which at least one of the route schedules includes a first depot as a start location, at least one delivery location, and a second depot as an end location. The initializing includes defining a plurality of particles within a solution space of allowable route schedules, each particle representing an allowable route schedule for the plurality of demands and the plurality of delivery vehicles and represented by a corresponding position within the solution space, defining a velocity of each particle within the solution space, and calculating an optimization variable for each particle. The instructions, when executed, are further configured to cause at least one computing device to execute scheduling iterations, each scheduling iteration including calculating updated particles within the solution space, based on a current position and velocity of each particle, and calculating an updated optimization variable for each updated particle. The instructions, when executed, are further configured to cause at least one computing device to, upon completion of a maximum number of iterations, select the optimized route schedule from the executed scheduling iterations.

According to another general aspect, a computer-implemented method for executing instructions stored on a non-transitory computer readable storage medium includes accessing a demand database storing a plurality of demands for delivery, each demand specifying at least one item for delivery, and at least one delivery location, accessing a vehicle database to obtain vehicle data for a plurality of delivery vehicles, and accessing a depot database storing a plurality of depots, each depot representing a potential start location or end location for each delivery vehicle. The method further includes initializing scheduling iterations for determining an optimized route schedule for the plurality of demands and the plurality of vehicles, in which at least one of the route schedules includes a first depot as a start location, at least one delivery location, and a second depot as an end location. The initializing includes defining a plurality of particles within a solution space of allowable route schedules, each particle representing an allowable route schedule for the plurality of demands and the plurality of delivery vehicles and represented by a corresponding position within the solution space, defining a velocity of each particle within the solution space, and calculating an optimization variable for each particle. The method further includes executing scheduling iterations, each scheduling iteration including calculating updated particles within the solution space, based on a current position and velocity of each particle, and calculating an updated optimization variable for each updated particle. The method further includes, upon completion of a maximum number of iterations, selecting the optimized route schedule from the executed scheduling iterations.

According to another general aspect, a system includes at least one processor, and a non-transitory computer-readable storage medium storing instructions that are executable by at the least one processor. The system further includes a multi-depot delivery schedule optimizer configured to cause the at least one processor to access a demand database storing a plurality of demands for delivery, each demand specifying at least one item for delivery and at least one delivery location, access a vehicle database to obtain vehicle data for a plurality of delivery vehicles, and access a depot database storing a plurality of depots, each depot representing a potential start location or end location for each delivery vehicle. The multi-depot delivery schedule optimizer further includes an iteration controller configured to initialize scheduling iterations for determining an optimized route schedule for the plurality of demands and the plurality of vehicles, in which at least one of the route schedules includes a first depot as a start location, at least one delivery location, and a second depot as an end location. The multi-depot delivery schedule optimizer further includes a particle handler configured to define a plurality of particles within a solution space of allowable route schedules, each particle representing an allowable route schedule for the plurality of demands and the plurality of delivery vehicles and represented by a corresponding position within the solution space, the particle handler being further configured to update each position vector from iteration-to-iteration. The multi-depot delivery schedule optimizer further includes a normalizer configured to process each position vector to convert real numbers calculated by the particle handler when calculating each updated position vector into integer values corresponding to individual vehicles of the plurality of vehicles, demands of the plurality of demands, and depots of the plurality of depots.

The details of one or more implementations are set forth in the accompanying drawings and the description below. Other features will be apparent from the description and drawings, and from the claims.

DETAILED DESCRIPTION

Figure 1:
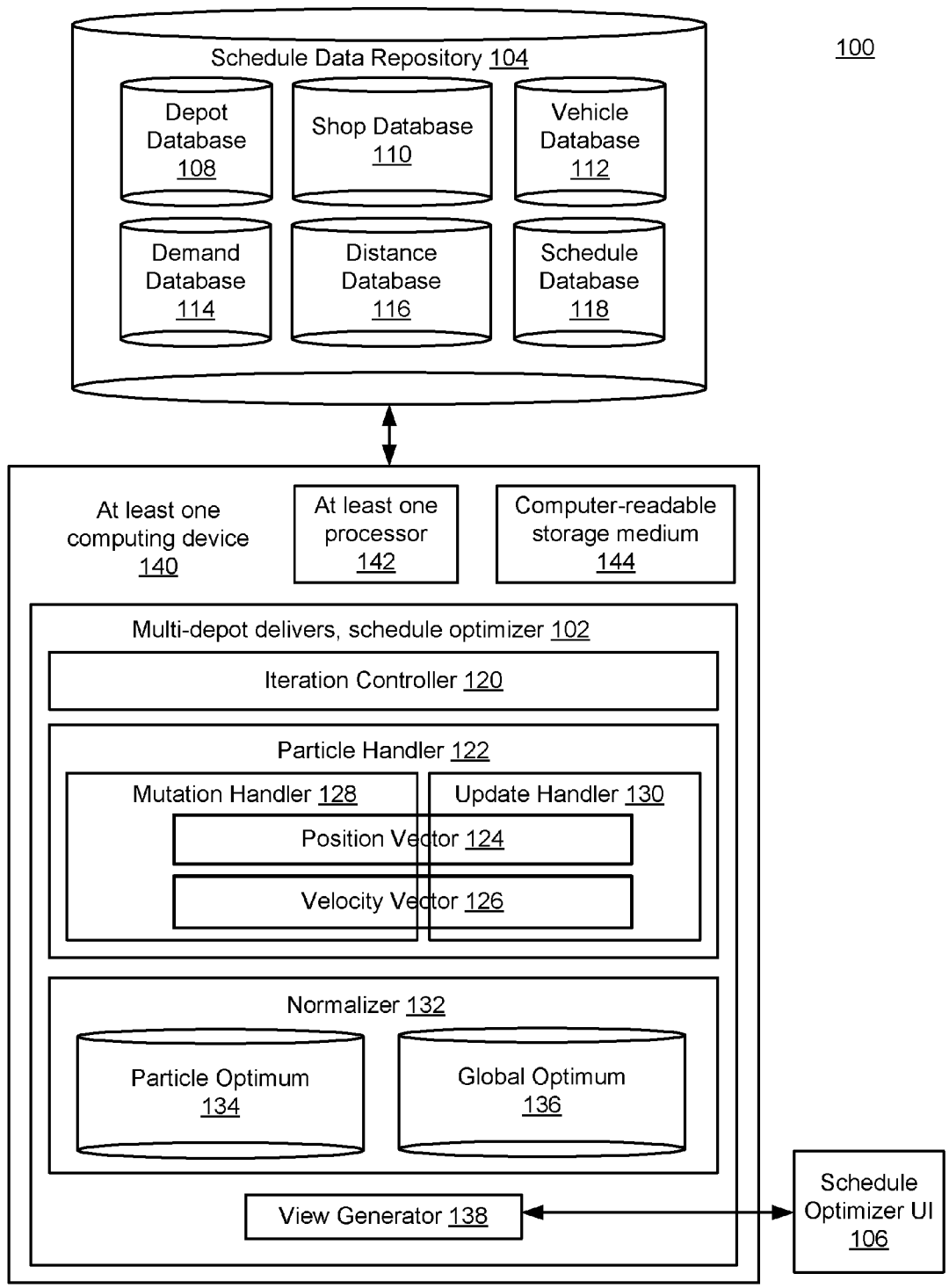
FIG. 1 is block diagram of a system for delivery schedule optimization with availability of multiple depots.

FIG. 1 is a block diagram of a system 100 for delivery schedule optimization with availability of multiple depots. In the example of FIG. 1, a multi depot delivery schedule optimizer 102 is configured to access relevant delivery data illustrated in FIG. 1 as being stored within a schedule data repository 104. As described in detail below, through analysis and processing of data accessed from the schedule data repository 104, the multi depot delivery schedule optimizer 102 may be configured to provide optimized route schedules to a user of the system 100, e.g., using a schedule optimizer user interface (UI) 106.

In more detail, as referenced above and described in detail below, e.g., with respect to FIGS. 3-5, delivery companies typically seek to load items for delivery at a depot, proceed to one or more delivery locations to unload items scheduled for delivery to each location, and then return to a same or different depot to repeat the process. In sufficiently simplified example scenarios, it is of course straightforward for a human operator to schedule deliveries. On the other hand, in many practical scenarios, a number of factors contribute to causing such delivery scheduling to be inefficient, expensive, or otherwise unacceptable.

For example, a number of variables may impact the delivery scheduling process. To name a few, non-limiting examples, such variables may include a capacity, availability, and operational costs of necessary delivery vehicles, absolute and relative locations/distances of various delivery locations to which the delivery should occur, absolute and relative locations/distances of the depots, various time constraints (e.g., loading/unloading time requirements or delivery deadlines), and absolute or relative business values of items being delivered.

With these and other delivery scheduling variables potentially being present, it often occurs that, even for a relatively small quantity of delivery demands and delivery vehicles, a number of possible scheduling solutions may grow exponentially/non-linearly, quickly exceeding an ability of a human operator to generate optimal or even acceptable scheduling solutions. For example, a human user may not be able to generate a feasible delivery schedule within an available amount of time. Further, a human operator might generate schedules that violate delivery deadlines or other constraints, or may generate a schedule that, while in conformance with relevant constraints, takes significantly longer and is significantly more expensive than other potential solutions.

In many scenarios, these and other scheduling difficulties arise, even when it is assumed that each delivery vehicle departs from a specific depot, executes its deliveries to scheduled delivery locations, and returns to the same depot. In many practical scenarios, however, it may occur that a delivery company has access to two or more depots, so that it is possible for a delivery vehicle to depart from a first depot, execute schedule deliveries at schedule delivery locations, and return to a second depot. These and other related scenarios significantly increase the already-large solution space for delivery scheduling optimization. Nonetheless, it is often desirable to utilize multiple depots in this manner. For example, with only a single depot being considered, it may occur that some delivery locations are, for practical purposes, too far for completing a desired delivery. Moreover, such long delivery distances may incur high operational costs for operating the relevant delivery vehicles, and/or may increase an average delivery cost across a number of deliveries.

On the other hand, with multiple depots, improved delivery scheduling options may exist. Unfortunately, as just referenced, such multi depot delivery scheduling is significantly more complex than delivery scheduling with a single depot.

For example, with various daily delivery demands that may exist, a service area of each of the multi depots may vary, while, for a single depot, a service area is simply an entire area serviceable by the single depot. Further, instead of fixed demand assignments, multi depot delivery scenarios may include dynamic assignments of demands among different depots. Consequently, it is not feasible to utilize a single scheduling algorithm for each depot individually. Notwithstanding, such dynamic assignments available in multi depot scenarios may be desirable, since, for example, delivery vehicles may utilize multiple depots, and relationships between delivery vehicles and depots may be many to many.

With respect to FIG. 1, the schedule data repository 104 illustrates a number of different types of relevant data that may be utilized by the multi depot delivery schedule optimizer 102. More detailed examples illustrating a content and format of each of the various databases of the schedule data repository 104 are provided below.

For purposes of the simplified example of FIG. 1, the schedule data repository 104 is illustrated as including a depot database 108. The depot database 108 may store all relevant or useful information characterizing the two or more depots available in the scenarios considered herein. For example, the depot database 108 may include unique depot identifiers for each depot, available items for delivery at each depot, or other relevant, descriptive information. In this regard, a depot will be understood to represent any manufacturing facility, inventory or warehouse facility, distribution center, or any other location at which items for sale are aggregated for delivery.

A shop database 110 may be configured to store data characterizing one or more shops that generally represent any available type of delivery location. Consequently, the described shops may represent retail or wholesale stores, residential or business addresses, or any other delivery locations to which deliveries may be scheduled by the multi depot delivery schedule optimizer 102.

A vehicle database 112 stores unique identifiers for all available delivery vehicles. As may be appreciated, such delivery vehicles may include, for example, delivery trucks, automobiles, bicycles, trains, jets, or any other relevant delivery vehicle, or combinations thereof. The vehicle database 112 may store unique identifications of individual delivery vehicles, along with relevant information, such as a capacity, operational cost, or availability of each delivery vehicle.

A demand database 114 stores data characterizing the various orders, requests, or other demands for delivery that may have been received. For example, in the following examples, it is assumed that various received demands originate from one or more of the shops characterized within the shop database 110. As discussed in more detail below, each demand may specify, for example, a quantity of items required for delivery, along with any necessary or desired constraints (e.g., delivery deadlines).

A distance database 116 may be utilized to store distances between any two or more locations, where locations in this context should be understood to refer to both depot locations and shop locations.

Finally with respect to the schedule data repository 104, a schedule database 118 may be configured to store information relevant to operations and outputs of the multi depot delivery schedule optimizer 102. For example, the schedule database 118 may of course store the final delivery route schedules generated by the multi depot delivery schedule optimizer 102 and displayed using the schedule optimizer UI 106. In various implementations, the schedule database 118 also may store intermediate results utilized by the multi depot delivery schedule optimizer 102, as well as various configuration parameters governing operations of the multi depot delivery schedule optimizer 102.

In operation, as described in detail below, the multi depot delivery schedule optimizer 102 explores a solution space of allowable route schedules. That is, a route schedule (also referred to as a delivery route schedule, delivery schedule, schedule, or similar), is generally defined as including at least one delivery vehicle carrying one or more items for delivery, and scheduled for travelling from a start depot to at least one shop associated with at least one demand, and thereafter returning to a same or different depot. Then, each feasible or allowable (e.g., constraint compliant) route schedule may be understood to represent a position within the entire solution space of available route schedules.

A manner in which the multi depot delivery schedule optimizer 102 explores the route schedule solution space using these defined, initial positions may then be understood by way of analogy with a swarm or other type of collective behavior exhibited, e.g., by birds or other animals. For example, when a flock of birds explores a physical space, e.g., for food gathering or migration purposes, each bird may be considered to have a physical position or location, as well as a velocity. Then, it may occur that each bird finds two or more food sources. For each such bird, one food source may be better than the others. For the flock of birds as a whole, one food source will be the overall best available food source.

In swarm or collective behavior, the birds tend to adjust their positions within the physical area based on attempts to identify and gather at the individual or overall best-available food sources. Although the birds may or may not locate the actual, single best food source within the geographical area, this type of collective behavior typically results in more frequently locating an acceptable or superior food source then would be located by an individual bird exploring the same geographical area for the same amount of time.

As referenced above, the analogy proceeds by considering any selected, feasible route schedule solution to be a particle at a "position" within an overall solution space of feasible route schedules. An iteration controller 120 then executes a number of iterations, where, at each iteration, each particle moves with a certain "velocity" to a new position (i.e., feasible route schedule) within the solution space. Carrying the analogy further, the "food" sought by these particle movements may be represented using an optimization variable. For example, an objective function may be defined for optimizing a profit, timeliness, quality, or other optimization variable, or combinations thereof, associated with the delivery scheduling operations of the system 100. Just as the bird movements are dictated by a best food source located by each bird, and a best overall or global food source found by any bird, the updated position and velocity of each particle may be determined at each iteration of the iteration controller 120 based on a best (e.g., maximum) value of the optimization variable for each particle, and at overall or global best value for the optimization variable for any particle.

In more detail, a particle handler 122 may be configured to generate initial values for a position vector 124 and a velocity vector 126. As just described, and as explained in more detail below, each such position vector and velocity vector will be associated with an initial set of route scheduling solutions.

In some implementations, a mutation handler 128 may be configured to provide random or other types of mutations or changes to one or both of the vectors 124, 126, from one iteration to the next. As described in detail below, such mutations may help ensure that a sufficient quantity or percentage of the available route schedule solutions base is explored before an optimized route schedule is selected.

Otherwise, an update handler 130 may be configured, as described above, to update the vectors 124, 126 based on current values of the optimization variable associated with available instances of the vectors 124, 126.

In this regard, in practice, it will be appreciated that there may be a number of different techniques available for representing a relevant set of demands and delivery vehicles, along with relevant depots, when constructing the vectors 124, 126. Also in practice, it will be appreciated that an entirety of a route schedule solution space generally includes a continuum of values, whereas allowable, feasible solutions will only have integer values. For example, in a delivery location "1" and a delivery location "2" may be available as possible delivery locations within a solution space. However, in calculating updated values for the vectors 124, 126, the update handler 130 may calculate a delivery location having a value "1.8." In these and similar scenarios, since such calculated solutions do not correspond to real-world, feasible route schedules, a normalizer 132 may be configured to perform an encoding/decoding representation of ensuring feasible route schedule solutions are reached. For instance, in the example just given, a normalizer 132 may save the delivery location as having a value of "2," e.g, may raise the real number to the next-highest integer value.

With these normalized values, the normalizer 132 may store a particle optimum 134 for each particle. As described, the particle optimum 134 represents a best value for a relevant optimization variable for each particle, across all iterations including that particle.

In other words, as described in detail below, as the iteration controller 120 executes multiple iterations, each particle will move to a new position at each iteration, and will have a corresponding, calculated value for its associated optimization variable at that position. Thus, the particle optimum 134 represents, for each particle, the best value for the optimization variable across all such iterations.

Similarly, a global optimum 136 represents a best value for the optimization variable across all particles and across all executed iterations. With respect to the global optimum 136, as well as the particle optimum 134, it will be appreciated that it is not necessary for the normalizer 132 to store all of the calculated optimization variable values across all the iterations. Instead, as described in detail below, the normalizer 132 may simply store a single best value for each particle, and globally, and simply update any such value at any time that a current iteration exceeds that value.

In practice, the iteration controller 120 may be configured to execute a predefined or maximum number of iterations, and to output one or more resulting route schedules upon completion thereof. In additional or alternative example implementations, the iteration controller 120 may cease executing iterations when a certain level of the optimization variable value (e.g., profit) is reached, or in response to some other termination condition.

Further in FIG. 1, a view generator 138 is configured to generate the schedule optimizer UI 106, and thereby illustrate the determined, optimized route schedule. In this regard, it will be appreciated that the schedule optimizer UI 106 may be configured to display calculated route schedules using many conventional techniques. Additionally, the schedule optimizer UI 106 may provide functionality allowing a user of the system 100 to select between two or more generated route schedules. Further, the schedule optimizer UI 106 may be configured to enable a user of the system 100 to alter various configuration parameters governing operations of the multi depot delivery schedule optimizer 102, some of which are described below.

In the example of FIG. 1, the multi depot delivery schedule optimizer 102 is illustrated as being executed at least one computing device 140, which itself is illustrated as including at least one processor 142, as well as a non-transitory computer readable storage medium 144. Of course, the at least one computing device 140 is intended to provide a simplified example illustrating a transformation of a general purpose computing device into a special purpose computing device by the multi depot delivery schedule optimizer 102. As such, many conventional hardware and/or software components of the at least one computing device 140 are not illustrated in the simplified example of FIG. 1, such as, for example, a monitor or other display that may be utilized to provide the schedule optimizer UI 106, various input/output devices, and various hardware/software for executing network communications.

In the latter regard, it will be appreciated that the at least one computing device 140 may represent two or more computing devices operating in parallel, and connected by a public or private computer network. For example, some portions of the multi depot delivery schedule optimizer 102 may be executed at a server having a relatively high level of hardware resources, while other parts of the multi depot delivery schedule optimizer 102 may be executed locally at a client device of the user of the system 100.

Further, two or more computing devices, or two or more processors represented by the at least one processor 142, may be configured to implement operations of the multi depot delivery schedule optimizer 102 in parallel. For example, operations of the particle handler 122 in calculating mutations or updates of the various particles may be executed in parallel.

The non-transitory compute readable storage medium 144 may be understood to store instructions, that, when executed by the at least one processor 142, provide execution of the multi depot delivery schedule optimizer 102. In additional or alternative examples, the computer readable storage medium 144 may be used to store various types of relevant data, including the schedule data repository 104.

Although the multi depot delivery schedule optimizer 102 of FIG. 1 illustrates a number of separate, discrete components and sub-components, it will be appreciated that such illustration is merely for the sake of non-limiting example. In other example implementations, any two or more of the various components of the multi depot delivery schedule optimizer 102 may be combined for execution as a single component. Conversely, it may occur that any single component or sub-component of the multi depot delivery schedule optimizer 102 may be divided for execution of two or more separate components or sub-components.

Figure 2:
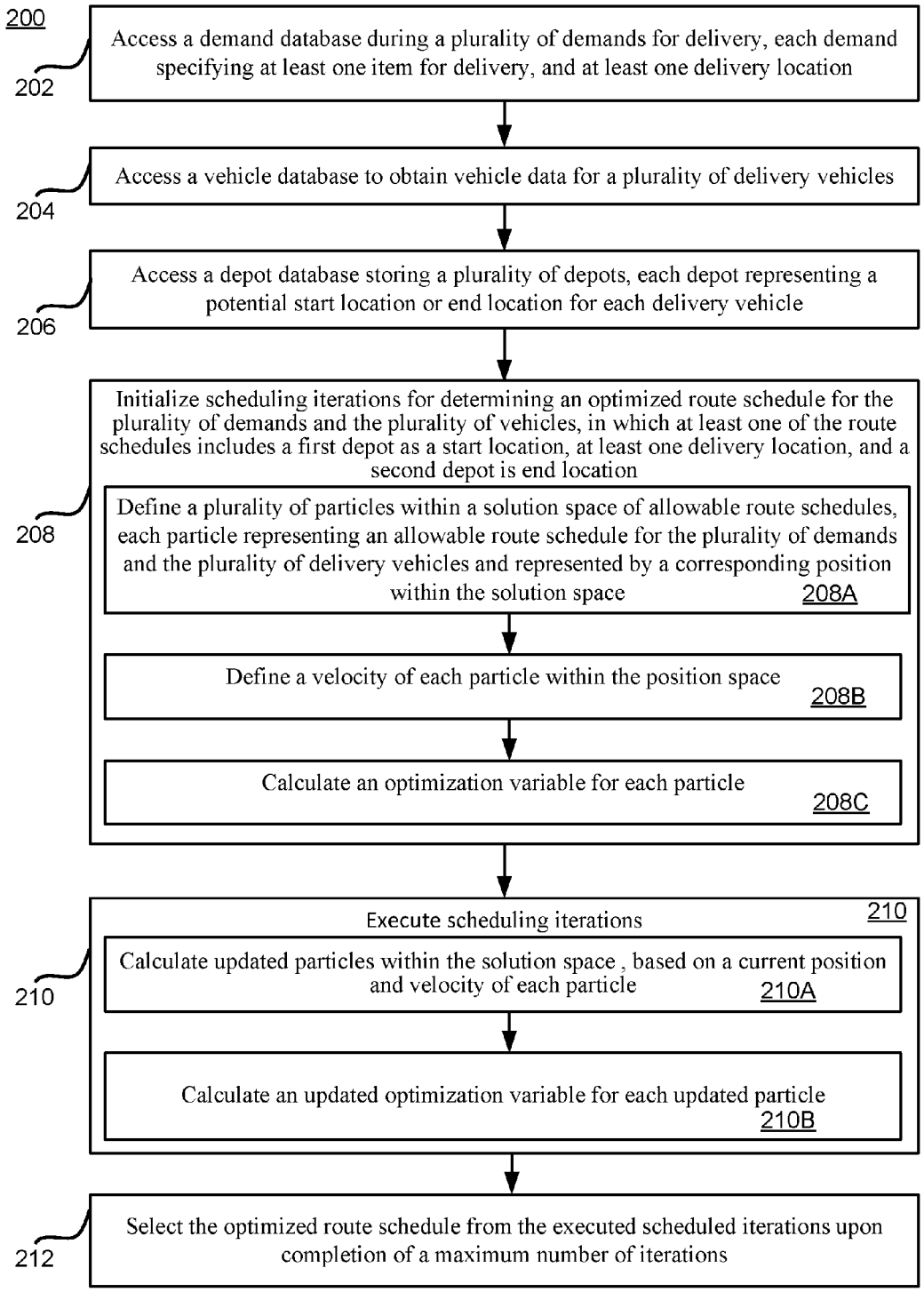
FIG. 2 is a flowchart illustrating example operations of the system of FIG. 1.

FIG. 2 is a flowchart 200 illustrating example operations of the system 100 of FIG. 1. In the example of FIG. 2, operations 202-212 are illustrated as separate, sequential operations. However, it will be appreciated that in various implementations, additional or alternative operations may be included, one or more operations or sub-operations may be omitted, and the various operations may be executed in an order different than that shown. In all such implementations, any two or more operations or sub-operations may be executed in a partially or completely overlapping or parallel manner or in a nested, iterative, looped, or branched fashion.

In the example of FIG. 2, a demand database during a plurality of demands for delivery may be accessed, each demand specifying at least one item for delivery, and at least one delivery location (202). For example, the multi depot delivery schedule optimizer 102 may access the demand database 114.

A vehicle database may be accessed to obtain vehicle data for a plurality of delivery vehicles (204). For example, the multi depot delivery schedule optimizer 102 may access the vehicle database 112.

A depot database storing a plurality of depots may be accessed, each depot representing a potential start location or end location for each delivery vehicle (206). For example, the multi depot delivery schedule optimizer 102 may access the depot database 108 of FIG. 1.

Scheduling iterations for determining an optimized route schedule for the plurality of demands and the plurality of vehicles may be initialized, in which at least one of the route schedules includes a first depot as a start location, at least one delivery location, and a second depot is end location (208). For example, the iteration controller 120 may be configured to initialize iterative operations of the particle handler 122 and the normalizer 132, as referenced above and described in more detail below.

In the initializing, a plurality of particles may be defined within a solution space of allowable route schedules, each particle representing an allowable route schedule for the plurality of demands and the plurality of delivery vehicles and represented by a corresponding position within the solution space (208A). For example, the particle handler 122 may initialize the position vector 124 representing an initial set of positions corresponding to an initial set of route schedules. For example, the initial position vector 124 may be determined randomly or semi-randomly, manually, and/or based on some position assignment criteria.

A velocity of each particle within the position space may be defined (208B). For example, the particle handler 122 may generate an initial velocity vector 126, so that each particle of the position vector 124 is associated with a corresponding velocity. Again, the initial velocities may be selected randomly or semi-randomly, manually, or based on some velocity assignment criteria.

An optimization variable for each particle may be calculated (208C). For example, the particle handler 122 may calculate a value of an optimization variable for each position/particle within the position vector 124. As referenced above and described in more detail below, such calculation may result in non-integer values that do not correspond to real-world values for the demands, delivery locations, depots, or delivery vehicles. Consequently, the normalizer 132 may be utilized to convert the calculated values into integer values. It will be appreciated, in an initial iteration, any value of the optimization variable for each particle will represent a best (only) value for that particle, and will therefore be stored as a particle optimum 134 for a corresponding particle. A global optimum value 136 may also be selected from the initial set of particle optimum values. For example, as referenced above, the optimization variable may represent, or include, a profit generated by each position/particle/route schedule.

Scheduling iterations may then be executed (210). For example, the iteration controller 120 may proceed with some number of iterations.

For example, updated particles within the solution space may be calculated, based on a current position and velocity of each particle (210A). For example, the particle handler 122, e.g., the update handler 130, may calculate updated values for the position vector 124 and the velocity vector 126. As referenced above and described in more detail below, the mutation handler 128 may be configured to participate in the iterative process by, for at least some iterations and at least some particle/positions/velocities, generating a random change or mutation therefore.

Then, an updated optimization variable for each updated particle may be calculated (210B). For example, the particle handler 122 and the normalizer 132 may proceed to calculate updated optimization variables for each updated particle. For each particle, the particle optimum 134 will be updated if the current value of the optimization variable is an improvement over any or all previous optimization variable values. The global optimum 136 will of course also be updated when one of the updated optimization variables has a value representing an improvement over all previously-calculated optimization variable values for all particles and all iterations.

The iteration controller 120 will continue the iterative process of calculating updated particles. Although not specifically illustrated in the example of FIG. 2, in some implementations, the current updated particles will be calculated based at least in part on the existing optimum values 134, 136 from previous iterations. As a result, a current updated particle will "follow" best-known route schedule solutions within the solution space, thereby exhibiting advantageous aspects of the swarm or collective behavior referenced in the analogy above.

Upon completion of a maximum number of iterations, the optimized route schedule may be selected from the executed scheduled iterations (212). For example, the iteration controller 120 may determine a maximum number of iterations as a predefined value, or based on a maximum allowed time for iterations to execute, or on a particular value for the global optimum 136 being reached, or on a maximum number of iterations executed for which the value of the global optimum 136 remains within a predefined range. Of course, other criteria for determining the maximum number of iterations may be utilized, including combinations of any of the just-referenced examples.

Figure 3:
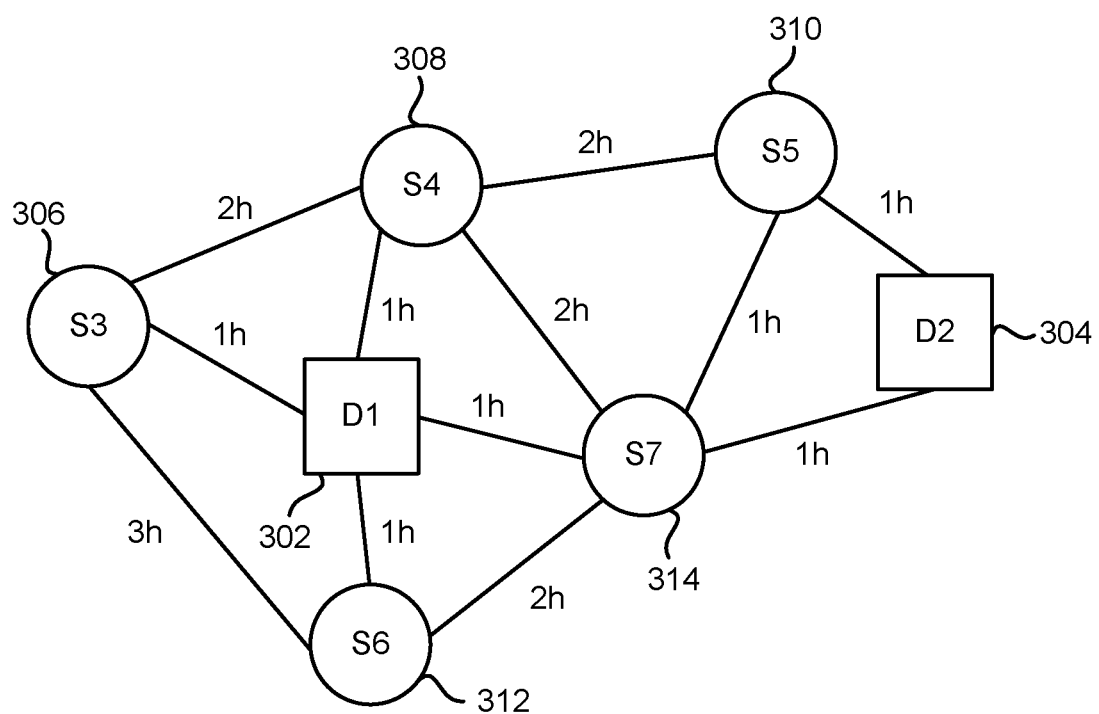
FIG. 3 is a block diagram illustrating a delivery context in which the system of FIG. 1 may be used.

FIG. 3 is a block diagram illustrating an example delivery context to which the system 100 of FIG. 1 may be applied. As illustrated, a first depot 302 and a second depot 304 are available. A plurality of delivery locations 306, 308, 310, 312, 314 represent sources of delivery demands to which deliveries must be made. For the sake of the simplified example of FIG. 3, it is assumed that two delivery vehicles are available to conduct the deliveries. Again for the sake of the example, the delivery vehicles may be assumed to be trucks, and FIG. 3 illustrates estimated drive times between the various locations, such as one hour between the first depot 302 and the delivery location 312, two hours between the delivery locations 308, 310, and three hours between the delivery locations 306, 312.

Figure 4:
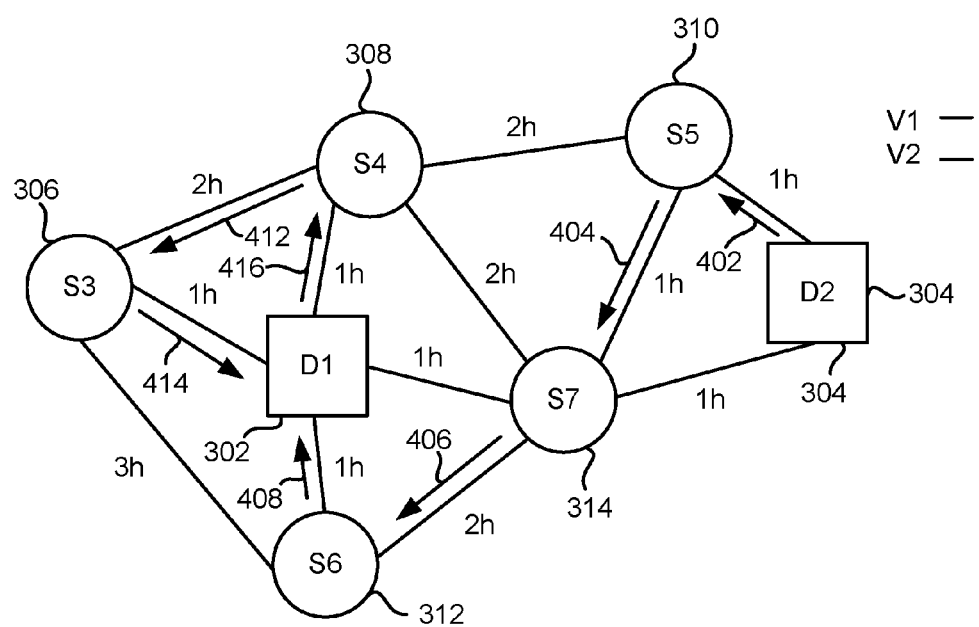
FIG. 4 is a block diagram illustrating a first example solution for delivery schedule optimization in the context of the example of FIG. 3.
Figure 5:
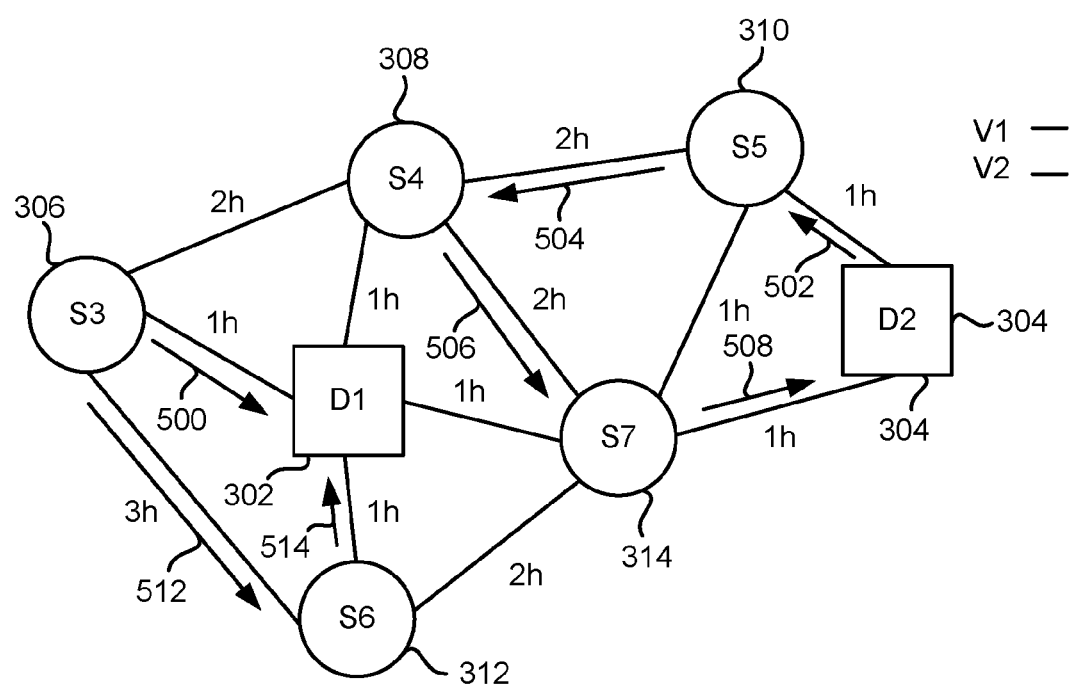
FIG. 5 is a block diagram of a second example solution for delivery schedule optimization using the system of FIG. 1 in the context of the example of FIG. 3.

FIGS. 4 and 5 illustrate example route schedule solutions for the scenario of FIG. 3. Specifically, as shown in FIG. 4, a first vehicle may have a route schedule defined by delivery segments 402, 404, 406, 408. More specifically, as shown, such a route schedule involves a departure of the first vehicle from the second depot 304 to make a delivery to the delivery location 310, as represented by the arrow 402. Next, the delivery vehicle departs the delivery location 310 and proceeds to the delivery location 314, as shown by the arrow 404. A delivery vehicle departs the delivery location 314 and travels to the delivery location 312, as shown by the arrow 406. Finally, the delivery vehicle leaves the location 312 and at the first depot 302, as shown by the arrow 408. A summation of the delivery route segments 402-408 thus provides a total drive time of five hours.

Meanwhile, similarly, a second vehicle may depart from the first depot 302, travel to the delivery location 308, as shown by an arrow 410, and then to the delivery location 306, as shown by an arrow 412. In this example, the delivery vehicle may return from the delivery location 306 to the first depot 302, as shown by an arrow 414. In this example, the total drive time is four hours, so that the total drive time for the example solution of FIG. 4 is nine hours.

Meanwhile, in FIG. 5, a second route schedule solution for the same scenario of FIG. 3 illustrates that the first vehicle may depart from the second depot 304 and travel to the delivery location 310, as shown by an arrow 502. And then to the delivery location 308 (arrow 504), then to the delivery location 314 (506), and finally back to the original, second depot 304 (508). Thus, this example has a drive time of six hours.

The second delivery vehicle may depart the depot 302 to travel to the delivery location 306 (510), and then to the delivery location 312 (512), and finally back to the first depot 302 (514). In this example, the drive time of the second delivery vehicle is five hours, so that the total drive time for FIG. 5 is eleven hours.

On the above description of FIGS. 1 and 2, it will be appreciated that the examples of FIGS. 4 and 5 may represent two particles within the solution space. For example, FIGS. 4 and 5 may represent two separate particles, moving with a certain velocity for each within a solution space and for a given iteration. In another example, FIG. 4 might represent a current position within the solution space, while FIG. 5 represents a preceding, earlier position/solution from a preceding iteration. As also referenced above, in order for the types of route schedule solutions of FIGS. 4 and 5 to be represented and utilized mathematically within the system 100 of FIG. 1, it is necessary to encode the route schedule solutions of FIGS. 4 and 5 as the position vector 124, associated with the velocity vector 126. In order to provide a basis for expressing the route schedule solutions mathematically for use in the system 100, as well as for mathematically expressing related constraints (e.g., delivery deadlines) and variables (e.g., the optimization variable), example mathematical notations are provided in Table 1:

TABLE 1

| Notation | Description |
| --- | --- |
| $D_h$ | Depot h<br>h = 1, 2, . . . , H |
| $S_i$ | Shop i<br>i = H + 1, H + 2, . . . , H + N |
| $N_i$ | Node i, node can be a depot or a shop<br>i = 1, 2, . . . , H + N |
| $Dm_j$ | Demand j<br>j = 1, 2, . . . , M |
| $Sh_j$ | Shop ID of demand j |
| $Q_j$ | Quantity of demand j |
| $B_j$ | Business value of demand j |
| $U_j$ | Unloading time of demand j |
| $V_k$ | Vehicle k<br>k = 1, 2, . . . , L |
| $Ca_k$ | Capacity of vehicle k |
| $Co_k$ | Cost for vehicle k driving one hour |
| $Dh_k$ | Maximum driving hours of vehicle k |
| $D_{ij}$ | Distance from $N_i$ to $N_j$<br>i = 1, 2, . . . , H + N<br>j = 1, 2, . . . , H + N |
| $X_{jk}$ | j = 1, 2, . . . , M<br>k = 1, 2, . . . , L<br>$X_{jk} = \begin{cases} 1 & \text{if } D_j \text{ is supplied by } V_k \\ 0 & \text{otherwise} \end{cases}$ |
| $Y_{ijk}$ | i = 1, 2, . . . , H + N<br>j = 1, 2, . . . , H + N<br>k = 1, 2, . . . , L<br>$Y_{ijk} = \begin{cases} 1 & \text{if } V_k \text{ drives from } N_i \text{ to } N_j \\ 0 & \text{otherwise} \end{cases}$ |
| $R_k$ | Route of vehicle k, starting from one depot, followed by a number of demands, ending to one depot |

As shown in Table 1, the notation $D_h$ refers to a depot h, where a total number of depots is represented as h=1, 2, . . . H. $S_i$ represents a shop, store, or other delivery location. The value i is expressed as being=H+1, H+2 . . . H+N. In other words, with respect to the examples of FIGS. 3-5, depots may initially be numbered, followed by a numbering of other delivery locations in sequence. For example, the first depot is designated as D1, and the second depot 304 is designated as D2. Thus, H=2. Then, the delivery locations 306-314 begin numbering at a value following the highest-numbered depot, so that the first delivery location 306 is numbered as 3, or H=2+1. For a total number of five delivery locations (N=5). The highest numerical designator for a delivery location in FIGS. 3-5 is = to H+N=2+5=7. More generally, the term node may refer to either of a depot or a shop, so that a node $N_n$ may have values in which n=1, 2, . . . H+N.

A demand j may be presented as $Dm_j$, where j=1, 2, . . . , M. A shop identifier for a demand j may be represented as $Sh_j$. A quantity of a demand j may be represented as $Q_j$, while a business value of demand j (e.g., a gross or net revenue, or sales price) may be represented as $B_j$, and an unloading time of demand j may be represented as $U_j$.

With respect to delivery vehicles, $V_k$ represents a vehicle k, where values for k can range from k=1, 2 . . . , L. A capacity of each vehicle k may be represented as $Ca_k$, and, similarly, a cost per hour for driving a vehicle k may be represented as $Co_k$. A maximum number of driving hours for a vehicle k may be represented as $Dh_k$.

$D_{ab}$ represents a distance between nodes $N_a$ and $N_b$. As shown, a and b can have values ranging from 1, 2, . . . H+N. Then, a value $X_{jk}$ for a demand j being delivered by a vehicle k represents a binary function that will have a value of 1 if in fact a given demand is supplied by a specific vehicle, and otherwise will have a value of 0. For example, for demand j=1 and delivery vehicle k=1, x will=1 if the first delivery vehicle executes a delivery to the first delivery location. If the first delivery vehicle submits a delivery QA second demand location, then $X_{11}=0$, while $X_{12}=1$. As will be demonstrated below, this binary variable is useful in including specific deliveries that occur, and/or excluding potential deliveries that do not actually occur in the context of a given route schedule solution.

Similarly, a value $Y_{abk}$ is another binary variable. For $Y_{abk}$, the value will be 1 when a vehicle $V_k$ drives a distance from a node $N_a$ to a node $N_b$, and will otherwise be 0. Again, this binary value is useful in including driving distances for a particular delivery vehicle that occurs in a specific route schedule solution, while excluding potential distances driven by delivery vehicles that are not part of the given route schedule solution.

Finally in the example of Table 1, the notation $R_k$ represents a route of a vehicle k. As may be understood from the present description, a route is generally represented by at least one depot, at least one delivery location, and a same or different depot as an ending location. As will be understood from the following description, the system 100 of FIG. 1 is capable of exploring solution spaces in which a given depot represents the same start and end location for a specific vehicle route, as well as route schedule solutions in which the start and end depots for a given route schedule are different.

With the notation of Table 1, it is possible to express constraints governing operations of the system 100 of FIG. 1. For example, one constraint is that a number of vehicles starting from a given depot is equal to, or less than, a total number of vehicles, as shown in Equation 1:

$$\sum_{i=1}^{H} \sum_{j=H+1}^{H+N} \sum_{k=1}^{L} Y_{ijk} \leq L \qquad \text{Equation 1}$$

In another constraint, a supplied demand may only be delivered by one vehicle:

$$\sum_{k=1}^{L} X_{jk} \leq 1, j = 1, 2, \ldots, M \qquad \text{Equation 2}$$

In another constraint, a total quantity in a route cannot exceed a total capacity of the vehicle on that route:

$$\sum_{j=1}^{M} Q_j X_{jk} \leq Ca_k, k = 1, 2, \ldots, L \qquad \text{Equation 3}$$

As a final example of a constraint, a drive time of a route is not allowed to exceed the maximum hours for the relevant vehicle, as shown in equation 4:

$$\sum_{i=1}^{H+N} \sum_{j=1}^{H+N} Y_{ijk} D_{ij} \leq Dh_k, k = 1, 2, \ldots, L \qquad \text{Equation 4}$$

Also using the notation of Table 1, an objective function for the optimization variable referenced above may be expressed, as in the example of equation 5:

$$\text{Max} \left( \sum_{i=1}^{M} \sum_{m=1}^{L} B_i X_{im} - \sum_{j=1}^{H+N} \sum_{k=1}^{H+N} \sum_{l=1}^{L} D_{jk} Co_l Y_{jkl} \right) \qquad \text{Equation 5}$$

More specifically, as shown, equation 5 represents an optimization in which a maximum profit is obtained. That is, it may be observed that the first parameter of Equation 5, $\Sigma_{i=1}^{M} B_i X_i$, represents a business value e.g., gross income. As may be observed, the value $X_{jk}$ is the above-referenced binary variable, so that business values are only aggregated for specific demands and vehicles that are included within the route schedule solution for which a business value is being calculated. Meanwhile, the second term $-\Sigma_{j=1}^{H+N} \Sigma_{k=1}^{H+N} \Sigma_{l=1}^{L} D_{jk} Co_l Y_{jkl}$ represents a cost subtracted from a business value, to thereby provide the profit. Again, with reference to the binary value for the variable $Y_{abk}$, it will be appreciated that cost will only be included for businesses for which corresponding deliveries actually occur within the relevant route schedule solution.

Tables 2-7 illustrate example formats and content for corresponding databases 108-118 of the schedule data repository 104. Specifically, as shown, table 2 illustrates an example of a depot database 108, in which each depot represents a node with a unique identifier and name

TABLE 2

| Column name | Description |
| --- | --- |
| Depot ID | Identity of depot |
| Depot name | Name of depot |

Table 3 illustrates a shop database 110, in which each shop is regarded as a node with an identifier and name.

TABLE 3

| Column name | Description |
| --- | --- |
| Depot ID | Identity of depot |
| Depot name | Name of depot |

Table 4 represents a demand table corresponding to the demand database 114. As shown, each demand may be associated with the demand identifier and a corresponding shop identifier, as well as a quantity, business value, and uploading time. As may be appreciated, each shop may have dozens of demands of various values for the quantity, business value, and unloading time of each delivery.

TABLE 4

| Column name | Description |
| --- | --- |
| Demand ID | Identity of demand |
| Shop ID | Identity of shop |
| Quantity | Demand quantity, number of boxes |
| Business value | Business value of demand |
| Unloading time | Time for unloading goods |

A vehicle database format is illustrated in table 5, as may be used with the vehicle database 112. As shown, each vehicle will be stored with its own properties, such as a vehicle identifier, capacity, cost, and maximum driving hours.

TABLE 5

| Column name | Description |
| --- | --- |
| Demand ID | Identity of demand |
| Shop ID | Identity of shop |
| Quantity | Demand quantity, number of boxes |
| Business value | Business value of demand |
| Unloading time | Time for unloading goods |

Table 6 illustrates an example of a distance database 116 of FIG. 1. As shown, since depots and shops can be regarded as nodes, each node can be stored in connection with other nodes and intervene distances.

TABLE 6

| Column name | Description |
| --- | --- |
| Demand ID | Identity of demand |
| Shop ID | Identity of shop |
| Quantity | Demand quantity, number of boxes |
| Business value | Business value of demand |
| Unloading time | Time for unloading goods |

Table 7 illustrates the example format and content for the schedule database 118. As shown, table 7 thus represents output data and is showing results for multi depot delivery scheduling optimizations. As shown, the schedule database 118 may include a vehicle identifier for each vehicle, a start depot, end depot, and route in which the order of included demand IDs is provided.

TABLE 7

| Column name | Description |
|---|---|
| Demand ID | Identity of demand |
| Shop ID | Identity of shop |
| Quantity | Demand quantity, number of boxes |
| Business value | Business value of demand |
| Unloading time | Time for unloading goods |

As referenced above, the notation of Table 1 also may be used to encode route schedule solutions, such as those of FIGS. 4 and 5, to thereby obtain the position vector 124 and the velocity vector 126. Initial results of such encoding operations for a sample scenario are provided below, with respect to table 8 and table 9. For the examples of table 8 and table 9, in using the notation of table 1, it is assumed H depots, N shops, M demands, and L vehicles are available. Then, table 8 represents a demand table, in which, in the example 9, demands 1-9 are encoded together with a corresponding vehicle and an order in which each vehicle satisfies each demand. More specifically, a vector X is constructed, where the vector X is the position vector 124 and includes two sub-vectors $X_v$ and $X_o$. As $X_v$ is a sub-vector indicating which demand is supplied by which vehicle, the sub-vector $X_v$ will have M dimensions corresponding to the M demands. In other words, in the example, three available vehicles must successfully complete deliveries for all 9 demands.

Meanwhile, the delivery order of a given demand within a larger route is expressed as a sub-vector $X_o$. Since every demand must be satisfied as just referenced, the sub-vector $X_o$ will also have M=9 dimensions. Thus, it may be observed that a total number of dimensions of the demand table of table 8, including the two sub-vectors $X_v$ and $X_o$ will be = to N+M=9+9=18.

TABLE 8

| | Demand | | | | | | | | |
|---|---|---|---|---|---|---|---|---|---|
| | 1 | 2 | 3 | 4 | 5 | 6 | 7 | 8 | 9 |
| Xv | 1 | 2 | 3 | 1 | 2 | 1 | 2 | 3 | 2 |
| Xo | 2 | 4 | 2 | 1 | 2 | 3 | 1 | 1 | 3 |

Meanwhile, Table 9 is a vehicle table in which each of the three vehicles 1, 2, 3 is associated with a start depot $X_s$ and an end depot $X_e$. In other words, $X_s$ and $X_e$ represent two additional sub-vectors for the overall position vector X. As may be observed, each of the sub-vectors $X_s$, $X_e$ has a total number of L=3 dimensions, since each vehicle must have both a start and end depot. Therefore, the total number of dimensions for the vehicle table of table 9 is = to L+L=3+3=6.

TABLE 9

| Vehicle | 1 | 2 | 3 |
|---|---|---|---|
| Xs | 1 | 3 | 4 |
| Xe | 2 | 2 | 3 |

Thus, as shown in Tables 8 and 9, a scenario in which 9 demand IDs (1, 2, 3, 4, 5, 6, 7, 8, 9), 3 vehicle IDs (1, 2, 3) and 4 depot IDs (1, 2, 3, 4) are included. As may be observed, taken together, before sub-vectors included in tables 8 and 9 thus represent a total solution example within a larger solution space. That is, for the 3 vehicles $V_k$, k=1, 2, 3, 3 corresponding routes $R_k$, k=1, 2, 3 are encoded. For example, for vehicle k=1, $R_1$ has a route of 1 (referencing start node $X_s$=1), then delivery locations corresponding to demands 4, 1, 6, and ending with ending depot $X_e$=2. Similarly, a second $R_2$ may be expressed as 3, 7, 5, 9, 2, 2, where the initial value of 3 refers to the starting depot $X_s$=3 for the second vehicle, the intermediate value 7, 5, 9, 2 refer to demands supplied by the second vehicle, and the final value 2 references the end node $X_e$=2. Similarly, and finally for the example of tables 8 and 9, a third route $R_3$ may be expressed as 4, 8, 3, 3, where again the initial 4 refers to the start depot, the final 3 refers to the end depot, and the intermediate 8, 3 refers to the demands 8, 3 supplied by the third vehicle during its route. Thus, a total number of dimensions of the position vector X would be 2M+2L.

As may be understood from the above description of FIGS. 1-2, the position vector X encoded in Tables 8 and 9 thus represents a specific particle and route schedule solution within an overall solution space of the example delivery scenario. For example, the position vector X in the examples of tables 8 and 9 may include integer values for the demands, delivery vehicles, and depots, as shown, and may be associated with a second iteration of the iterative process described above.

For example, it may occur that an initial particle/solution/position vector X is designated, not specifically illustrated here, which may then be updated to obtain the value shown in Tables 8 and 9 as part of a next or current iteration conducted by the multi depot delivery schedule optimizer 102.

As referenced above with respect to the normalizer 132, it may occur that the calculations performed by the particle handler 122 in executing the update from the first iteration to the second iteration may result in non-integer values for the various position vector values. Then, the normalizer 132 is configured to normalize these non-integer values and obtain integer values.

For example, Tables 10 and 11 illustrate pre-normalization values that may be calculated by the particle handler 122 from an initial position vector. For example, an initial position vector X may be mutated by the mutation handler 128, or updated by the update handler 130, as described below. Results of such calculations may then include the non-integer values of tables 9 and 10:

TABLE 10

| | Demand | | | | | | | | |
|---|---|---|---|---|---|---|---|---|---|
| | 1 | 2 | 3 | 4 | 5 | 6 | 7 | 8 | 9 |
| Xv | .8 | 1.5 | 2.1 | 0.9 | 1.6 | 0.3 | 1.9 | 3.0 | 1.2 |
| Xo | 6.7 | 8.5 | 5.6 | 5.8 | 2.9 | 8.8 | 0.7 | 3.4 | 7.4 |

TABLE 11

| Vehicle | 1 | 2 | 3 |
|---|---|---|---|
| Xs | 0.8 | 2.3 | 3.8 |
| Xe | 1.9 | 2.0 | 2.8 |

Then, in a normalization process, for the sub-vectors $X_v$, $X_s$, and $X_e$, normalization may proceed by raising each real number x to a nearest, higher integer value [x]. For example, with reference to table 10, the first value of the table 4 $X_v$ is 0.8, which would be normalized to an integer value of 1, as shown in table 8.

For the sub-vector $X_o$, the real numbers may be normalized into integers based on an order or sequence of the real numbers. For example, with reference to the sub-vector $X_o$ of table 10, the values of the real numbers include, for example, 6.7, 5.8, and 8.8. Then, as illustrated with respect back to table 8, the values will be normalized to an order of 2, 1, 3. It should be noted that such sequencing for the sub-vector $X_o$ is performed only with respect to the relevant demand/vehicle. In the example just given, the values of 6.7, 5.8, 8.8 all correspond to the vehicle 1 satisfying demands 4, 1, 6, as already described above with respect to the route $R_1$.

Figure 6:
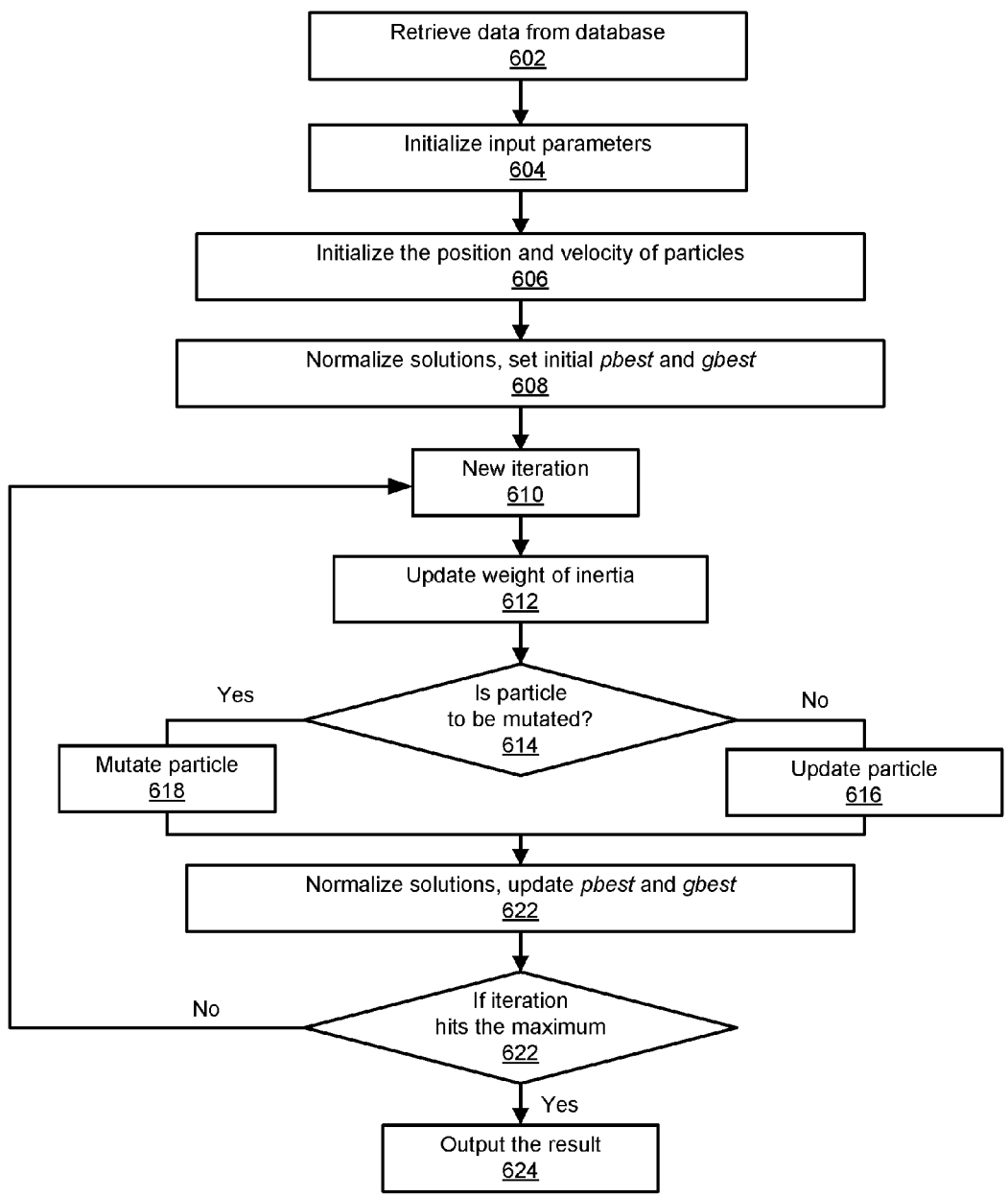
FIG. 6 is a flowchart illustrating more detailed example operations of the system of FIG. 1.

FIG. 6 is a flowchart 600 illustrating more detailed example operations of the system 100 of FIG. 1, using the notations and methods described above with respect to tables 1-11. As shown, the process 600 of FIG. 6 begins with retrieval of relevant data from relevant databases, as may be understood with respect to the schedule data repository 104 (602). At a time t=0 for a first iteration to be conducted, relevant input parameters may be initialized (604). For example, a number of maximum iterations $I_{max}$ may be set. A number of particles $N_p$ may be set. A probability of particle mutation p also may be set. Further, a value w representing a weight of inertia may be set along with values for learning parameters $C_1$, $C_2$. A use of the values w, $c_1$, $c_2$ is provided in more detail, below.

Then, a position vector X and velocity vector V may be initialized for all particles (606). In performing the initializations of the position and velocity vectors, a number of constraints may be required, as expressed in Equation 6:

$0 < Xv_j \le L, j=1,2,\ldots,M$ $0 < Xo_j \le M, j=1,2,\ldots,M$ $0 < Xs_k \le H, k=1,2,\ldots,L$ $0 < Xe_k \le H, k=1,2,\ldots,L$ $-L < Vv_j \le L, j=1,2,\ldots,M$ $-M < Vo_j \le M, j=1,2,\ldots,M$ $-H < Vs_k \le H, k=1,2,\ldots,L$ $-H < Ve_k \le H, k=1,2,\ldots,L$     Equation 6

As may be observed, Equation 6 illustrates that the various position sub-vectors are constrained within relevant ranges, including being restricted from having negative values. Meanwhile, corresponding velocity sub-vectors are also set within relevant ranges, although, in the example, the velocity sub-vectors are permitted to have negative values representing forward or reverse direction within the solution space.

If necessary, normalization of the initial position vector and velocity vector may be executed using the technique just described above with respect to tables 10 and 11 (608). In this context, values for the optimization variable for each particle may be calculated in a per particle best value pbest may be stored as the initial particle optimum 134, and the best of these may be stored as the global optimum 136, represented here as gbest.

At a next iteration t=t+1 (610), the value w for the weight of inertia may be updated using equation 7:

$$w' = w \frac{I_{max} - t}{I_{max}} \qquad \text{Equation 7}$$

In this context, as referenced above, the value w for weight of inertia represents a limitation on a velocity of each particle. Conceptually, the value w has an affect that, over time, and/or as a maximum number of iterations is approached, a particle velocity will decrease relatively more slowly, so that the corresponding position of the particle changes less drastically with each iteration. In other words, the effect is that a particle moves more slowly as the particle approaches a final, optimized solution.

In any given iteration, a given particle may or may not be mutated (614). As referenced, the probability of mutation p dictates the manner and extent to which such mutations may occur, and represents a configurable value in this regard. As referenced above, such mutations may be helpful in ensuring that one or more particles does not become restricted to a local optimum value for the optimization variable, which may be significantly less than other local values, or global values.

Equation 8 provides an example mutation technique:

$$X_i' = \frac{X_i}{\pi\left(1 + \frac{\varphi_i}{C}\right)}\left(1 + \frac{I_{max} - t}{I_{max}}\right) \qquad \text{Equation 8}$$

As may be observed from Equation 8, $X_i$ refers to the position vector X before a mutation, while $X_i'$ refers to the position vector X after mutation. C is a constant. Overall, Equation 8 uses a Cauchy distribution, which is a known continuous probability distribution. Other distributions could be used, as well.

If mutation does not occur, the particle may be updated normally, using Equations 9 and 10:

$V_i' = wV_i + c_1 r_1 (pbest_i - X_i) + c_2 r_2 (gbest_i - X_i)$     Equation 9

$X_i' = X_i + V_i'$     Equation 10

That is, as shown, the updated velocity may be calculated, and then used to calculate the updated position. In Equation 9, the parameters $c_1$ and $c_2$ are scaling parameters, and may also be referred to as learning parameters. $r_1$ and $r_2$ are random numbers between 0 and 1.

Referring back to Equation 8 with reference to Equations 9 and 10, the value $\varphi_i$ refers to a search range of the iteration i. That is, for given values of $c_1$, $c_2$, given the range between 0 and 1 for $r_1$ and $r_2$, and given values for the current iteration for $pbest_i$, $gbest_i$, w, $V_i$, and $X_i$, maximum and minimum values for $V_i'$ can be calculated to constitute the search range.

Following the mutation (616) or the update (618) of each particle, a resulting, mutated and/or updated particle is obtained, and may thus require normalization, along with associated updating of the values pbest and gbest (620).

More specifically, in the example, the updating of the values pbest and gbest may be executed according to the following rules. For example, if the solution is not feasible (e.g., by violating a constraint), a value of the objective function defining optimization variable may be set to $-\infty$. If the solution is feasible and the value of the objective function representing the optimization variable is greater than the value of pbest currently stored, the updated pbest would be stored as a new value/solution. If the value being considered is greater than the value of gbest, then gbest would be updated as well.

If the current iteration reaches the maximum iteration $I_{max}$ (622), then the current value of gbest may be provided as the optimized route schedule solution (624). Otherwise (622), iterations may continue until the maximum iteration is reached.

The following pseudo code represents example pseudo code for implementing the flowchart 600 of FIG. 6.

```
1   Function scheduleDelivery(Depots, Shops, Demands, Vehicles,
    Distances):
2   % Input:     Depots - Set of depots
3               Shops - Set of shops
4               Demands - Set of demands with quantity, business value,
                etc.
5               Vehicles - Set of vehicles with capacity, cost and driving
    hours
6               Distances - Set of distances between depots and shops
7   % Output: Scheduling - Multi-depot delivery scheduling
8    t = 0;
9    Initialize input parameters including Np, w, c1, c2, p
10   For each particle in particle set
11      Initialize position vector X and velocity vector V
12      Normalize solution
13      Set initial pbest
14   End for
15   Set initial gbest
16   While t < maximum iteration
17      t = t + 1;
18      Update w;
19      For each particle in particle set
20          If rand( ) < p
21              Mutate particle
22          Else Update the position and velocity of particle
23          End if
24          Normalize solution
25          Update pbest
26      End for
27      Update gbest
28   End while
29   Return gbest.
```

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:

access a demand database storing a plurality of demands for delivery, each demand specifying at least one item for delivery, and at least one delivery location;

access a vehicle database to obtain vehicle data for a plurality of delivery vehicles;

access a depot database storing a plurality of depots, each depot representing a potential start location or end location for each delivery vehicle;

initialize scheduling iterations for determining an optimized route schedule for the plurality of demands and the plurality of vehicles, in which at least one of the route schedules includes a first depot as a start location, at least one delivery location, and a second depot as an end location, wherein the initializing includes defining a plurality of particles within a solution space of allowable route schedules, each particle representing an allowable route schedule for the plurality of demands and the plurality of delivery vehicles and represented by a corresponding position within the solution space, defining a velocity of each particle within the solution space, and calculating an optimization variable for each particle, execute scheduling iterations, each scheduling iteration including calculating updated particles within the solution space, based on a current position and velocity of each particle, calculating an updated optimization variable for each updated particle, using the equation:

$$\text{Max}\left(\sum_{i=1}^{M}\sum_{m=1}^{L}B_i X_{im} - \sum_{j=1}^{H+N}\sum_{k=1}^{H+N}\sum_{i=1}^{L}D_{jk}Co_i Y_{jkl}\right)$$

where B is a business value of a demand i, X is a first binary function, M is a total number of the demands, H is a total number of the depots, N is a total number of nodes, L is a total number of the vehicles, D is a distance between nodes j and k, Co is a cost per hour for driving a vehicle k, and Y is a second binary function, and upon completion of a maximum number of iterations, outputting via a user interface results of a reduced number of the executed iterations, the reduced number of the executed iterations including at least first and second candidate generated route schedules, respectively, and receiving input via the user interface to select the optimized route schedule from the at least first and second candidate generated route schedules to achieve efficient routing of the vehicles among the plurality of depots and nodes in satisfying the demands for delivery.

2. The computer program product of claim 1, wherein the instructions, when executed, are further configured to cause the at least one computing device to execute a scheduling iteration of the scheduling iterations, including:

calculating the updated particles including calculating an updated velocity for each particle; and calculating an updated position for each particle, based on its corresponding updated velocity.

3. The computer program product of claim 1, wherein the instructions, when executed, are further configured to cause the at least one computing device to execute a scheduling iteration of the scheduling iterations, including:

calculating, for a current iteration of the scheduling iterations, a best particle position for a particle within the solution space, as compared to particle positions of preceding iterations for the particle and judged using its corresponding optimization variable in the solution space.

4. The computer program product of claim 3, wherein the instructions, when executed, are further configured to cause the at least one computing device to execute a scheduling iteration of the scheduling iterations, including:

calculating, for a current iteration of the scheduling iterations, a global best particle position for all particles within the solution space, as compared to particle positions of preceding iterations for all particles and judged using optimization variables for all particles in the solution space.

5. The computer program product of claim 4, wherein the instructions, when executed, are further configured to cause the at least one computing device to execute a scheduling iteration of the scheduling iterations, including:

calculating the updated particles including calculating an updated velocity for each particle, based on the best particle position and the global best particle position; and calculating an updated position for each particle, based on its corresponding updated velocity.

6. The computer program product of claim 1, wherein the instructions, when executed, are further configured to cause the at least one computing device to execute a scheduling iteration of the scheduling iterations, including:

determining whether to perform a particle mutation for the scheduling iteration of the scheduling iterations, based on a predefined mutation probability; and calculating the updated particles including mutating, randomly or pseudo-randomly, a current position of at least one particle of the plurality of particles to obtain an updated position for an updated particle of the updated particles.

7. The computer program product of claim 1, wherein the optimization value is calculated as a profit equal to a gross income less a cost and predicted to be achieved in conjunction with a corresponding route schedule.

8. The computer program product of claim 1, wherein the instructions, when executed, are further configured to cause the at least one computing device to:

define the plurality of particles including encoding a position vector in which a vehicle subvector having a number of dimensions equal to a number of the plurality of demands defines which demand of the plurality of demands is supplied by which vehicle.

9. The computer program product of claim 1, wherein the instructions, when executed, are further configured to cause the at least one computing device to:

define the plurality of particles including encoding a position vector in which an order subvector having a number of dimensions equal to a number of the plurality of demands defines a delivery order of a corresponding demand of the plurality of demands.

10. The computer program product of claim 1, wherein the instructions, when executed, are further configured to cause the at least one computing device to:

define the plurality of particles including encoding a position vector for each particle;

determine an updated position vector, in real numbers, based on the calculating the updated particles; and normalize the real numbers to obtain integer values corresponding to individual vehicles of the plurality of vehicles, demands of the plurality of demands, and depots of the plurality of depots, wherein each non-integer position vector is converted to a next-highest integer value.

11. The computer program product of claim 1, wherein the instructions, when executed, are further configured to cause the at least one computing device to:
define the plurality of particles including encoding a position vector in which a start depot subvector having a number of dimensions equal to a number of the plurality of vehicles indicates a start location for a depot of the plurality of depots.

12. The computer program product of claim 1, wherein the instructions, when executed, are further configured to cause the at least one computing device to:
define the plurality of particles including encoding a position vector in which an end depot subvector having a number of dimensions equal to a number of the plurality of vehicles indicates an end location for a depot of the plurality of depots.

13. A computer-implemented method for executing instructions stored on a non-transitory computer readable storage medium to select an optimized delivery schedule, the method comprising:
accessing a demand database storing a plurality of demands for delivery, each demand specifying at least one item for delivery, and at least one delivery location;
accessing a vehicle database to obtain vehicle data for a plurality of delivery vehicles;
accessing a depot database storing a plurality of depots, each depot representing a potential start location or end location for each delivery vehicle;
initializing scheduling iterations for determining an optimized route schedule for the plurality of demands and the plurality of vehicles, in which at least one of the route schedules includes a first depot as a start location, at least one delivery location, and a second depot as an end location, wherein the initializing includes
defining a plurality of particles within a solution space of allowable route schedules, each particle representing an allowable route schedule for the plurality of demands and the plurality of delivery vehicles and represented by a corresponding position within the solution space,
defining a velocity of each particle within the solution space, and calculating an optimization variable for each particle,
executing scheduling iterations, each scheduling iteration including
calculating updated particles within the solution space, based on a current position and velocity of each particle, and
calculating an updated optimization variable for each updated particle, using the equation:

$$\text{Max}\left(\sum_{i=1}^{M}\sum_{m=1}^{L} B_i X_{im} - \sum_{j=1}^{H+N}\sum_{k=1}^{H+N}\sum_{i=1}^{L} D_{jk} Co_i Y_{jkl}\right)$$

where B is a business value of demand i, X is a first binary function, M is a total number of the demands, H is a total number of the depots, N is a total number of nodes, L is a total number of the vehicles, D is a distance between nodes j and k, Co is a cost per hour for driving a vehicle k, and Y is a second binary function, and
upon completion of a maximum number of iterations, outputting via a user interface results of a reduced number of the executed iterations, the reduced number of the executed iterations including at least first and second candidate generated route schedules, respectively, and receiving input via the user interface to select the optimized route schedule from the at least first and second candidate generated route schedules to achieve efficient routing of the vehicles among the plurality of depots and nodes in satisfying the demands for delivery.

14. The method of claim 13, wherein executing the scheduling iterations includes:
calculating the updated particles including calculating an updated velocity for each particle; and
calculating an updated position for each particle, based on its corresponding updated velocity.

15. The method of claim 13, wherein the optimization value is calculated as a profit equal to a gross income less a cost and predicted to be achieved in conjunction with a corresponding route schedule.

16. A system comprising: at least one processor; and
a non-transitory computer-readable storage medium storing instructions that are executable by at least one processor, the system further including
a multi-depot delivery schedule optimizer configured to cause the at least one processor to access a demand database storing a plurality of demands for delivery, each demand specifying at least one item for delivery and at least one delivery location, access a vehicle database to obtain vehicle data for a plurality of delivery vehicles, and access a depot database storing a plurality of depots, each depot representing a potential start location or end location for each delivery vehicle, the multi-depot delivery schedule optimizer including
an iteration controller configured to initialize scheduling iterations for determining an optimized route schedule for the plurality of demands and the plurality of vehicles, in which at least one of the route schedules includes a first depot as a start location, at least one delivery location, and a second depot as an end location,
a particle handler configured to define a plurality of particles within a solution space of allowable route schedules, each particle representing an allowable route schedule for the plurality of demands and the plurality of delivery vehicles and represented by a corresponding position within the solution space, the particle handler being further configured to update each position vector from iteration-to-iteration, wherein the particle handler is configured to define a velocity of each particle within the solution space, and calculate an optimization variable for each particle, and further configured to execute individual iterations of the scheduling iterations, each scheduling iteration including
calculating updated particles within the solution space, based on a current position and velocity of each particle,
calculating an updated optimization variable for each updated particle, using the equation:

$$\text{Max}\left(\sum_{i=1}^{M}\sum_{m=1}^{L} B_i X_{im} - \sum_{j=1}^{H+N}\sum_{k=1}^{H+N}\sum_{i=1}^{L} D_{jk} Co_i Y_{jkl}\right)$$

where B is a business value of demand i, X is a first binary function, M is a total number of the demands, H is a total number of the depots, N is a total number of nodes, L is a total number of the vehicles, D is a distance between nodes j and k, Co is a cost per hour for driving a vehicle k, and Y is a second binary function, and upon completion of a maximum number of iterations, outputting via a user interface results of a reduced number of the executed iterations, the reduced number of the executed iterations including at least first and second candidate generated route schedules, respectively, and receiving input via the user interface to select the optimized route schedule from the at least first and second candidate generated route schedules to achieve efficient routing of the vehicles among the plurality of depots and nodes in satisfying the demands for delivery; and a normalizer configured to process each position vector to convert real numbers calculated by the particle handler when calculating each updated position vector into integer values corresponding to individual vehicles of the plurality of vehicles, demands of the plurality of demands, and depots of the plurality of depots.

17. The system of claim 16, wherein each position vector includes:
   a vehicle subvector having a number of dimensions equal to a number of the plurality of demands and defining which demand of the plurality of demands is supplied by which vehicle; and
   an order subvector having a number of dimensions equal to a number of the plurality of demands and defining a delivery order of a corresponding demand of the plurality of demands.

18. The system of claim 17, wherein each position vector includes: a start depot subvector having a number of dimensions equal to a number of the plurality of vehicles and indicating a start location for a depot of the plurality of depots; and an end depot subvector having a number of dimensions equal to a number of the plurality of vehicles and indicating an end location for a depot of the plurality of depots.

19. The system of claim 16, wherein the optimization value is calculated as a profit equal to a gross income less a cost and predicted to be achieved in conjunction with a corresponding route schedule.

* * * * *